UNITED STATES PATENT OFFICE.

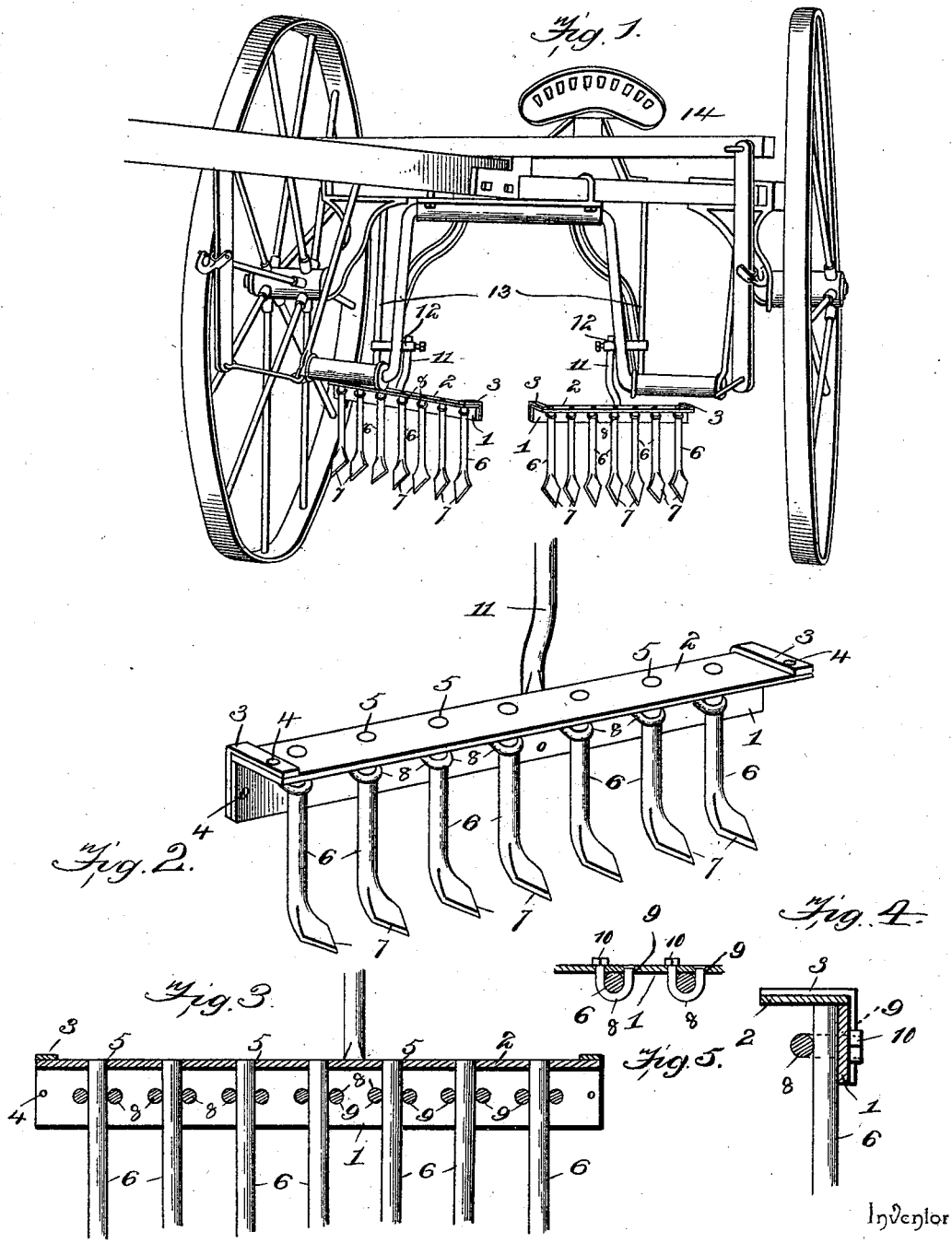

BURETTE M. MILLS, OF HILLSBORO, TEXAS.

HARROW ATTACHMENT.

SPECIFICATION forming part of Letters Patent No. 522,178, dated June 26, 1894.

Application filed September 29, 1893. Serial No. 486,821. (No model.)

*To all whom it may concern:*

Be it known that I, BURETTE M. MILLS, a citizen of the United States, residing at Hillsboro, in the county of Hill and State of Texas, have invented a new and useful Harrow Attachment, of which the following is a specification.

My invention relates to improvements in harrow attachments for plows or cultivators, and the objects in view are to provide a light, strong and durable attachment comprising a series of harrow or cultivator teeth, and to provide means for securely fastening the same in position upon the harrow-bar.

Other objects and advantages of the invention will appear in the following description, and the novel features thereof will be particularly pointed out in the claim.

Referring to the drawings:—Figure 1 is a perspective view of a cultivator provided with an attachment constructed in accordance with my invention. Fig. 2 is a detail in perspective of the attachment. Fig. 3 is a longitudinal sectional view through one end of the same. Fig. 4 is a vertical transverse sectional view therethrough. Fig. 5 is a horizontal sectional view.

Like numerals of reference indicate like parts in the several figures of the drawings.

In practicing my invention I employ two sections, and each consists of an angular harrow-bar, comprising two members or strips, namely, a vertical member 1 and a horizontal member 2, the same being arranged at a right angle to each other and bound together at their ends by L-shaped fastening straps 3. In this manner I produce practically a harrow-bar constructed of angle iron, which, indeed, if desired, may be the case, but I prefer to form the same of two members, as here shown. Rivets 4 pass through the members and the L-shaped straps so that the parts are rigidly secured. The upper member 2 is at intervals provided with perforations 5, the same being located at proper distances apart and uniformly arranged. In each of these openings 5, there is fitted the upper end of a tooth 6. These teeth may be of any desired form or style, but in the present instance terminate in what might be termed shovel points 7.

Staples 8, embrace the series of teeth in front of the vertical portion of the angular harrow bar and the terminals of said staples pass through pairs of perforations 9, with which the vertical portion of the harrow bar is provided. In rear of the harrow bar the ends of the staples are provided with binding or clamping nuts 10, whereby the teeth are secured rigidly in position.

A standard 11 is bolted or otherwise secured to the rear face of the harrow-bar, and these standards of the two sections are designed to be secured in any suitable manner, as by a cuff 12, to the opposite beams or other portions of a straddle-row cultivator 14.

From the foregoing description in connection with the accompanying drawings, it will be seen that I have provided a very simple and rigid form or construction of attachment for cultivators, and that when applied thereto all clods are thoroughly pulverized and the ground prepared for the reception of the seed.

Having described my invention, what I claim is—

The herein described harrow attachment for cultivators, the same consisting of the inverted L-shaped harrow-bar, comprising the independent horizontal and vertically disposed metal strips 1 and 2, the opposite inverted L-shaped metal angle-bars 3, embracing and riveted to the ends thereof, the upper horizontal strip being provided at intervals with perforations, and the vertical strip 1 being provided below the same with pairs of perforations, the teeth 6, having their upper ends seated in the perforations of the horizontal strip, the staples 8 embracing the teeth below the horizontal strip and having their terminals extended through the pairs of perforations of the vertical strip, and nuts arranged on the rear ends of the staples, substantially as specified.

In testimony that I claim the foregoing as my own I have hereto affixed my signature in the presence of two witnesses.

BURETTE M. MILLS.

Witnesses:
   J. C. GIVENS,
   I. M. GIVENS.